US010144668B2

(12) United States Patent
Altman et al.

(10) Patent No.: US 10,144,668 B2
(45) Date of Patent: Dec. 4, 2018

(54) METHOD AND APPARATUS FOR YIELDING HIGH EDGE STRENGTH IN CUTTING OF FLEXIBLE THIN GLASS (71) Applicant: CORNING INCORPORATED, Corning, NY (US)

(72) Inventors: Andrew Stephen Altman, Westfield, PA (US); Todd Benson Fleming, Elkland, PA (US); Anping Liu, Horseheads, NY (US); James Joseph Watkins, Corning, NY (US)

(73) Assignee: Corning Incorporated, Corning, NY (US)

( * ) Notice: Subject to any disclaimer, the term of this patent is extended or adjusted under 35 U.S.C. 154(b) by 8 days.

(21) Appl. No.: 15/504,947

(22) PCT Filed: Aug. 13, 2015

(86) PCT No.: PCT/US2015/044954
§ 371 (c)(1),
(2) Date: Feb. 17, 2017

(87) PCT Pub. No.: WO2016/028580
PCT Pub. Date: Feb. 25, 2016

(65) Prior Publication Data
US 2017/0275197 A1 Sep. 28, 2017

Related U.S. Application Data (60) Provisional application No. 62/039,667, filed on Aug. 20, 2014.

(51) Int. Cl.
C03B 33/04 (2006.01)
C03B 33/09 (2006.01)

(52) U.S. Cl.
CPC ............ *C03B 33/04* (2013.01); *C03B 33/091* (2013.01); *Y02P 40/57* (2015.11)

(58) Field of Classification Search
CPC ....... C03B 33/04; C03B 33/091; C03B 33/03; C03B 33/0222; C03B 33/093;
(Continued)

(56) References Cited

U.S. PATENT DOCUMENTS 5,428,510 A 6/1995 Shirai et al.
8,269,138 B2 9/2012 Garner et al.
(Continued)

FOREIGN PATENT DOCUMENTS

JP 2008080346 A 4/2008
JP 2008127223 A 6/2008
(Continued)

OTHER PUBLICATIONS

Gulati et al; "45.2: Two Point Bending of Thin Glass Substrate"; Society for Information Display (SID) 2011 Digest, p. 652-654.
(Continued)

*Primary Examiner* — Ghassem Alie
(74) *Attorney, Agent, or Firm* — Jeffrey A. Schmidt; Ryan T. Hardee (57) ABSTRACT Methods and apparatus for cutting a glass sheet along a cutting line into a desired shape. A laser source is configured to apply a laser beam to a beam location on the cutting line of the glass sheet. A source of cooling fluid is configured to apply a cooling fluid to a cooling band on the glass sheet to reduce a temperature of the glass sheet along the cooling path while elevating the temperature of the glass sheet at the beam location with the laser beam. The source of cooling fluid is configured to apply the cooling path as a cooling ring to circumscribe the beam location on the cutting line with the cooling band circumferentially spaced from the beam
(Continued)

location while the cooling path and the beam location move simultaneously together in order to propagate a fracture in the glass sheet along the cutting line.

14 Claims, 10 Drawing Sheets

(58) Field of Classification Search
CPC ... C03B 33/0215; C03B 33/023; B23K 26/40; B23K 2203/50; B23K 26/423; B23K 26/38; B23K 26/0846; B23K 26/0736; B26K 26/1417; G02B 27/0966; Y10T 225/321; Y01T 225/12
USPC .............. 225/2; 219/121.69, 121.68, 121.72, 219/121.67; 359/809
See application file for complete search history.

(56) References Cited

U.S. PATENT DOCUMENTS

| | | |
|---|---|---|
| 8,347,651 B2 | 1/2013 | Abramov et al. |
| 8,611,716 B2 | 12/2013 | Demeritt et al. |
| 9,260,337 B2 | 2/2016 | Abramov et al. |
| 9,422,188 B2 | 8/2016 | Garner et al. |
| 2006/0022008 A1 | 2/2006 | Brown et al. |
| 2008/0283509 A1* | 11/2008 | Abramov ............ B23K 26/0736 219/121.72 |
| 2009/0032505 A1* | 2/2009 | Huang .................. B23K 26/38 219/121.67 |
| 2009/0081512 A1 | 3/2009 | Blanchard et al. |
| 2009/0294419 A1* | 12/2009 | Abramov ............ B23K 26/0736 219/121.68 |
| 2010/0279067 A1 | 11/2010 | Sabia et al. |
| 2011/0159319 A1 | 6/2011 | Yamasaki et al. |
| 2013/0192305 A1 | 8/2013 | Black et al. |
| 2013/0280465 A1* | 10/2013 | Matsumoto ......... C03B 33/0222 428/43 |
| 2013/0280495 A1 | 10/2013 | Matsumoto |
| 2014/0352358 A1* | 12/2014 | Washko, Jr. .......... C03B 33/091 65/112 |
| 2015/0132525 A1 | 5/2015 | Kato et al. |
| 2015/0166393 A1* | 6/2015 | Marjanovic ........... C03B 33/091 428/131 |
| 2015/0183679 A1 | 7/2015 | Saito |
| 2015/0209898 A1 | 7/2015 | Kim et al. |
| 2015/0209911 A1* | 7/2015 | Yamada ................. B23K 26/38 219/121.67 |

FOREIGN PATENT DOCUMENTS

| | | |
|---|---|---|
| KR | 2011000308 A | 1/2011 |
| KR | 2012004793 A | 1/2012 |
| KR | 1163394 B1 | 7/2012 |
| KR | 1195600 B1 | 10/2012 |
| WO | 2015115604 A1 | 8/2015 |

OTHER PUBLICATIONS

Matthewson et al; "Strength Measurement of Optical Fibers by Bending"; J. Am. Ceram. Soc., 69 (11), 815-821 (1986).

* cited by examiner

METHOD AND APPARATUS FOR YIELDING HIGH EDGE STRENGTH IN CUTTING OF FLEXIBLE THIN GLASS

CROSS-REFERENCE TO RELATED APPLICATIONS

This application claims the benefit of priority under 35 U.S.C. § 371 of International Patent Application Serial No. PCT/US15/44954, filed on Aug. 13, 2015, which in turn, claims the benefit of priority of U.S. Provisional Patent Application Ser. No. 62/039,667 filed on Aug. 20, 2014, the contents of each of which are relied upon and incorporated herein by reference in their entireties.

BACKGROUND

The present disclosure relates to methods and apparatus for yielding high edge strength in cutting flexible thin glass.

Conventional manufacturing techniques for cutting flexible plastic substrates have been developed, where the plastic substrates employ a plastic base material laminated with one or more polymer films. These laminated structures are commonly used in flexible packaging associated with photovoltaic (PV) devices, organic light emitting diodes (OLED), liquid crystal displays (LCD) and patterned thin film transistor (TFT) electronics, mostly because of their relatively low cost and demonstrably reliable performance. Although the aforementioned flexible plastic substrates have come into wide use, they nevertheless exhibit poor characteristics in connection with at least providing a moisture barrier and providing very thin structures (indeed, the structures are relatively thick owing to the properties of plastic materials).

Accordingly, there are needs in the art for new methods and apparatus for fabricating a flexible substrate for use in, for example, PV devices, OLED devices, LCDs, TFT electronics, etc., particularly where the substrate is to provide a moisture barrier and the substrate is to be formed into a free-form shape.

SUMMARY

The present disclosure relates to employing a relatively thin, flexible, glass sheet (on the order of about 0.05 mm to about 0.3 mm, preferably between about 0.075 mm to about 0.250 mm) and cutting the glass sheet along a free form line that may include straight portions as well as curved portions.

Flexible glass substrates offer several technical advantages over the existing flexible plastic substrate in use today. One technical advantage is the ability of the glass substrate to serve as good moisture or gas barrier, which is a primary degradation mechanism in outdoor applications of electronic devices. Another advantage is the potential for the flexible glass substrate to reduce the overall package size (thickness) and weight of a final product through the reduction or elimination of one or more package substrate layers. As the demand for thinner, flexible substrates (of the thickness mentioned herein) increases in the electronic display industry, manufacturers are facing a number of challenges for providing suitable flexible substrates.

A significant challenge in fabricating flexible glass substrate for PV devices, OLED devices, LCDs, TFT electronics, etc., is cutting a source of relatively large, thin glass sheet into smaller discrete substrates of various dimensions and shapes with tight dimensional tolerances, good edge quality, and high edge strength. Indeed, a desired manufacturing requirement is to cut glass parts off a source glass sheet continuously, without interruption of the cutting line, where the cutting line includes at least some round and/or curved sections (e.g., for rounded corners), possibly of varying radii, and yielding very good edge quality and strength, for example on the order of at least about 300 MPa to about 500 MPa, preferably at least about 400-500 MPa, and more preferably at least about 450 MPa.

Although existing mechanical techniques for continuous cutting of irregular (free form) shapes provide for scoring (with a score wheel) and mechanical breaking (or snapping), the edge quality and strength achieved by such mechanical techniques are not sufficient for many applications where precision is required. Indeed, the mechanical scoring and breaking approach generates glass particles and manufacturing failures, which decreases the process yield and increases manufacturing cycle time.

In accordance with one or more embodiments herein, a laser cutting technique is employed to cut a thin glass sheet into a desired shape. Glass cutting techniques using a laser are known, however, the cutting of thin flexible glass with thicknesses discussed herein presents significant challenges, especially when tight dimensional tolerances and high edge strength are required manufacturing objectives. The conventional laser score and mechanical break process is nearly impossible to reliably employ with glass sheet thicknesses of less than about 0.3 mm, and especially in the range of 0.05 mm to 0.3 mm. Indeed, due to the relatively thin profile of a glass sheet of less than about 0.3 mm, the stiffness of the sheet is very low (i.e., the sheet is flexible), and the laser score and snap cutting process is easily adversely affected by thermal buckling, mechanical deformation, air flows, internal stress, glass warpage, and many other factors.

In contrast, the embodiments herein present laser cutting techniques resulting in a desired shape of very thin (0.05 mm-0.3 mm) flexible glass, whereby a one-step full separation of the free form shape from the source glass sheet is achieved along virtually any trajectory.

The novel methodology and apparatus provides for the propagation of a crack in the source glass sheet via a laser (for example a $CO_2$ laser beam) and simultaneous provision of a cooling fluid (for example a gas, for example air). Initiation of the crack is achieved using a mechanical tool or another laser, for example, and preferably is disposed outside a perimeter of the desired cutting line. The methodology and apparatus achieve particularly desirable results when applied to thin and ultra-thin glass sheets with thicknesses of less than about 0.3 mm, for example between about 0.05 mm to 0.3 mm, and/or between about 0.075 mm to 0.250 mm. Notably, cutting of thinner glass sheets is possible, and the cutting of thicker glass sheets (i.e., greater than about 0.3 mm) is also possible, although certain parameters may need to be adjusted in order to still obtain the edge strength results achieved on glass sheets less than about 0.3 mm. Additionally, the methodology and/or apparatus achieves an edge quality and strength of at least about 300 MPa to about 500 MPa, preferably at least about 400-500 MPa, and more preferably at least about 450 MPa, when measured by a two point bend test.

Advantages of the embodiments herein include: (i) very good dimensional stability; (ii) pristine straight cut edges; (iii) low damage edges on curved edges; (iv) high edge strength; (v) low if any edge degradation and/or part degradation; (vi) improved cleanliness; (vii) increased robustness and/or integrity of finished parts; (viii) meeting and/or exceeding very demanding customer requirements; (ix) providing a non-contact methodology that eliminates surface damage from processing.

Other aspects, features, and advantages will be apparent to one skilled in the art from the description herein taken in conjunction with the accompanying drawings. For example, the various features may be combined in any and all combinations as set forth in the following aspects.

According to a first aspect, there is provided a method, comprising:
supporting a source glass sheet and defining a free form cutting line that establishes a pattern that defines a desired final shape;
applying a laser beam to the glass sheet and continuously moving the laser beam relative to the glass sheet along the cutting line to elevate a temperature of the glass sheet at the cutting line, where the laser beam is of a circular shape;
applying a cooling fluid simultaneously with the application of the laser beam, such that the cooling fluid at least reduces the temperature of the glass sheet in order to propagate a fracture in the glass sheet along the cutting line;
controlling at least one of: (i) an energy density of the laser beam, (ii) a velocity of the laser beam relative to the glass sheet along the cutting line, (iii) a fluid flow of the cooling fluid, and (iv) a minimum radius of curvature of the cutting line, such that a B10 edge strength of a cut edge of the glass sheet is at least one of at least about 300 MPa to about 500 MPa, at least about 400-500 MPa, and more preferably at least about 450 MPa; and
separating waste glass from the glass sheet to obtain the desired shape.

According to a second aspect, there is provided the method of aspect 1, wherein the glass sheet is one of: (i) between about 0.05 mm-about 0.3 mm in thickness, and (ii) between about 0.075 mm-about 0.250 mm in thickness According to a third aspect, there is provided the method of aspect 2, wherein the energy density is controlled to be at least one of: (i) less than about 0.015 J/mm; (ii) less than about 0.014 J/mm; (iii) less than about 0.013 J/mm; (iv) less than about 0.012 J/mm; (v) less than about 0.011 J/mm; (vi) less than about 0.010 J/mm; (vii) less than about 0.009 J/mm; and (viii) less than about 0.008 J/mm.

According to a fourth aspect, there is provided the method of aspect 3, wherein the energy density is defined to be a power level of the laser beam (J/s) divided by the velocity (mm/min) of the laser beam relative to the glass sheet along the cutting line.

According to a fifth aspect, there is provided the method of any one of aspects 2 to 4, wherein the velocity of the laser beam relative to the glass sheet along the cutting line is controlled to be at least one of: (i) less than about 2000 mm/min; (ii) less than about 1900 mm/min; (iii) less than about 1800 mm/min; (iv) less than about 1700 mm/min; (v) less than about 1600 mm/min; (vi) less than about 1500 mm/min; (vii) less than about 1400 mm/min; (viii) less than about 1300 mm/min; (ix) less than about 1200 mm/min; (x) less than about 1100 mm/min; and (xi) less than about 1000 mm/min.

According to a sixth aspect, there is provided the method of aspect 5, wherein the velocity of the laser beam relative to the glass sheet along the cutting line is ≤1100 mm/in, and the number of arrest anomalies is <1.

According to a seventh aspect, there is provided the method of any one of aspects 2 to 4, wherein the fluid flow of the cooling fluid is controlled to be at least one of (i) at least about 60 lpm; (ii) at least about 70 lpm; (iii) at least about 80 lpm; (iv) at least about 90 lpm; (v) at least about 100 lpm; (vi) at least about 110 lpm; (vii) at least about 120 lpm; (viii) at least about 130 lpm; and (ix) at least about 140 lpm.

According to an eighth aspect, there is provided the method of aspect 7, wherein the fluid is air.

According to a ninth aspect, there is provided the method of any one of aspects 2 to 8, wherein the minimum radius of curvature of the cutting line is controlled to be at least one of: (i) at least about 2 mm; (ii) at least about 3 mm; (iii) at least about 4 mm; and (iv) at least about 5 mm.

According to a tenth aspect, there is provided the method of any one of aspects 1 to 9, wherein a diameter of the laser beam is one of: (i) between about 1 mm to about 4 mm, and (ii) 2 mm.

According to an eleventh aspect, there is provided the method of any one of aspects 1 to 10, wherein the cooling fluid is directed annularly around the laser beam toward the glass sheet.

According to a twelfth aspect, there is provided an apparatus for cutting a glass sheet into a desired shape, comprising:
a support table operating to support the glass sheet, where the glass sheet includes a free form cutting line that establishes a pattern that defines a desired final shape;
a laser source operating to apply a laser beam to the glass sheet that is continuously moved relative to the glass sheet along the cutting line to elevate a temperature of the glass sheet at the cutting line, where the laser beam is of a circular shape;
a source of cooling fluid operating to apply a cooling fluid simultaneously with the application of the laser beam, such that the cooling fluid at least reduces the temperature of the glass sheet in order to propagate a fracture in the glass sheet along the cutting line;
a controller operating to control at least one of: (i) an energy density of the laser beam, (ii) a velocity of the laser beam relative to the glass sheet along the cutting line, (iii) a fluid flow of the cooling fluid, and (iv) a minimum radius of curvature of the cutting line, such that a B10 edge strength of a cut edge of the glass sheet is at least one of at least about 300 MPa to about 500 MPa, at least about 400-500 MPa, and more preferably at least about 450 MPa.

According to a thirteenth aspect, there is provided the apparatus of aspect 12, in which the glass sheet is one of: (i) between about 0.05 mm-about 0.3 mm in thickness, and (ii) between about 0.075 mm-about 0.250 mm in thickness.

According to a fourteenth aspect, there is provided the apparatus of aspect 13, wherein the energy density is controlled to be at least one of: (i) less than about 0.015 J/mm; (ii) less than about 0.014 J/mm; (iii) less than about 0.013 J/mm; (iv) less than about 0.012 J/mm; (v) less than about 0.011 J/mm; (vi) less than about 0.010 J/mm; (vii) less than about 0.009 J/mm; and (viii) less than about 0.008 J/mm.

According to a fifteenth aspect, there is provided the apparatus of aspect 14, wherein the energy density is defined to be a power level of the laser beam (J/s) divided by the velocity (mm/min) of the laser beam relative to the glass sheet along the cutting line.

According to a sixteenth aspect, there is provided the apparatus of any one of aspects 13 to 15, wherein the velocity of the laser beam relative to the glass sheet along the cutting line is controlled to be at least one of: (i) less than about 2000 mm/min; (ii) less than about 1900 mm/min; (iii)

less than about 1800 mm/min; (iv) less than about 1700 mm/min; (v) less than about 1600 mm/min; (vi) less than about 1500 mm/min; (vii) less than about 1400 mm/min; (viii) less than about 1300 mm/min; (ix) less than about 1200 mm/min; (x) less than about 1100 mm/min; and (xi) less than about 1000 mm/min.

According to a seventeenth aspect, there is provided the apparatus of aspect 16, wherein the velocity of the laser beam relative to the glass sheet along the cutting line is controlled to be ≤1100 mm/in, and the number of arrest anomalies is <1.

According to an eighteenth aspect, there is provided the apparatus of any one of aspects 13 to 17, wherein the fluid flow of the cooling fluid is controlled to be at least one of (i) at least about 60 lpm; (ii) at least about 70 lpm; (iii) at least about 80 lpm; (iv) at least about 90 lpm; (v) at least about 100 lpm; (vi) at least about 110 lpm; (vii) at least about 120 lpm; (viii) at least about 130 lpm; and (ix) at least about 140 lpm.

According to a nineteenth aspect, there is provided the apparatus of aspect 18, wherein the fluid is air.

According to a twentieth aspect, there is provided the apparatus of any one of aspects 13 to 19, wherein the minimum radius of curvature of the cutting line is controlled to be at least one of: (i) at least about 2 mm; (ii) at least about 3 mm; (iii) at least about 4 mm; and (iv) at least about 5 mm.

According to a twenty first aspect, there is provided the apparatus of any one of aspects 12 to 20, wherein a diameter of the laser beam is one of: (i) between about 1 mm to about 4 mm, and (ii) 2 mm.

According to a twenty second aspect, there is provided the apparatus of any one of aspects 12 to 20, wherein the cooling fluid is directed annularly around the laser beam toward the glass sheet.

DESCRIPTION OF THE DRAWINGS

For the purposes of illustration, there are forms shown in the drawings that are presently preferred, it being understood, however, that the embodiments disclosed and described herein are not limited to the precise arrangements and instrumentalities shown.

DETAILED DESCRIPTION OF THE PREFERRED EMBODIMENTS

Figure 1:
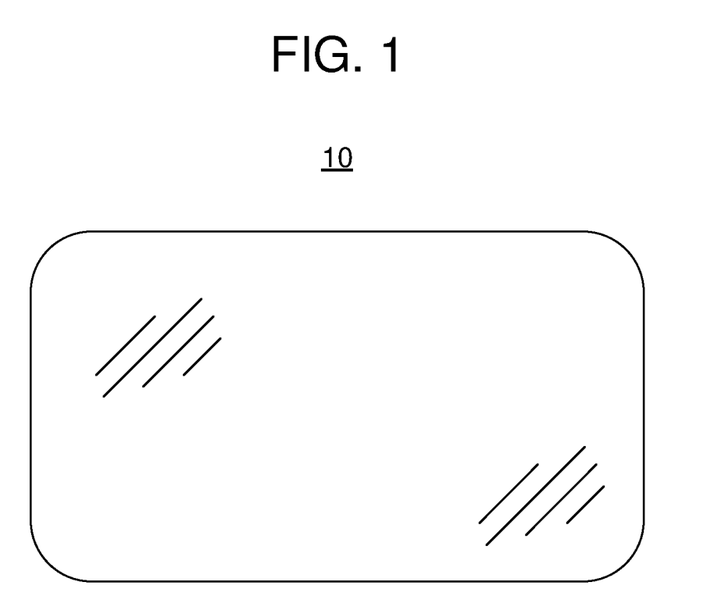
FIG. 1 is top view of a thin, glass substrate produced using one or more cutting methodologies and apparatus disclosed herein.

With reference to the drawings wherein like numerals indicate like elements there is shown in FIG. 1 a top view of a thin, glass substrate 10 produced using one or more cutting methodologies and apparatus disclosed herein. A number of characteristics of the glass substrate 10 are of importance when considering the disclosure herein. First, the glass substrate 10 (and the source glass sheet from which it is cut) is thin and/or ultra-thin, with a thickness of: (i) between about 0.05 mm-about 0.3 mm, and (ii) between about 0.075 mm-about 0.250 mm. While the advantageous edge characteristics, including high strengths and minimization of edge imperfections associated with the crack propagation, discussed herein are achieved with these thicknesses, the glass substrate 10 may be thinner and/or thicker than the ranges mentioned and desirable results still obtained although some of the parameters discussed (energy density, cutting velocity, cooling fluid flow, and/or radius of curvature) may need to be adjusted with other thicknesses and/or compositions of glasses. Second, the glass substrate 10 may be considered a free form shape, for example having at least one curved portion, and indeed potentially a plurality of curved portions, having one or more radii of curvature. For example, the glass substrate 10 is shown with four rounded corners, although any other shape may be employed, for example having a mix of rounded corners, sharp corners, straight beveled corners, etc. Third, the glass substrate 10 is intended to be formed via a one step, full separation cutting methodology in which the desired shape is obtained from a thin source glass sheet.

Another characteristic of the glass substrate 10, which is singled out for further discussion, is the quality and strength of the cut edges. In particular, the edge strength is at least one of: at least about 300 MPa to about 500 MPa, at least about 400-500 MPa, and more preferably at least about 450 MPa, when the substrate is subjected to a two point bend test. The two point bend test was carried out as described in the Society for Information Display (SID) 2011 Digest, pages 652-654, in a paper entitled "Two Point Bending of Thin Glass Substrate" by Suresh Gulati, et al. Such a high edge strength in combination with the relatively thin glass substrate 10 has not heretofore been achieved.

Figure 2:
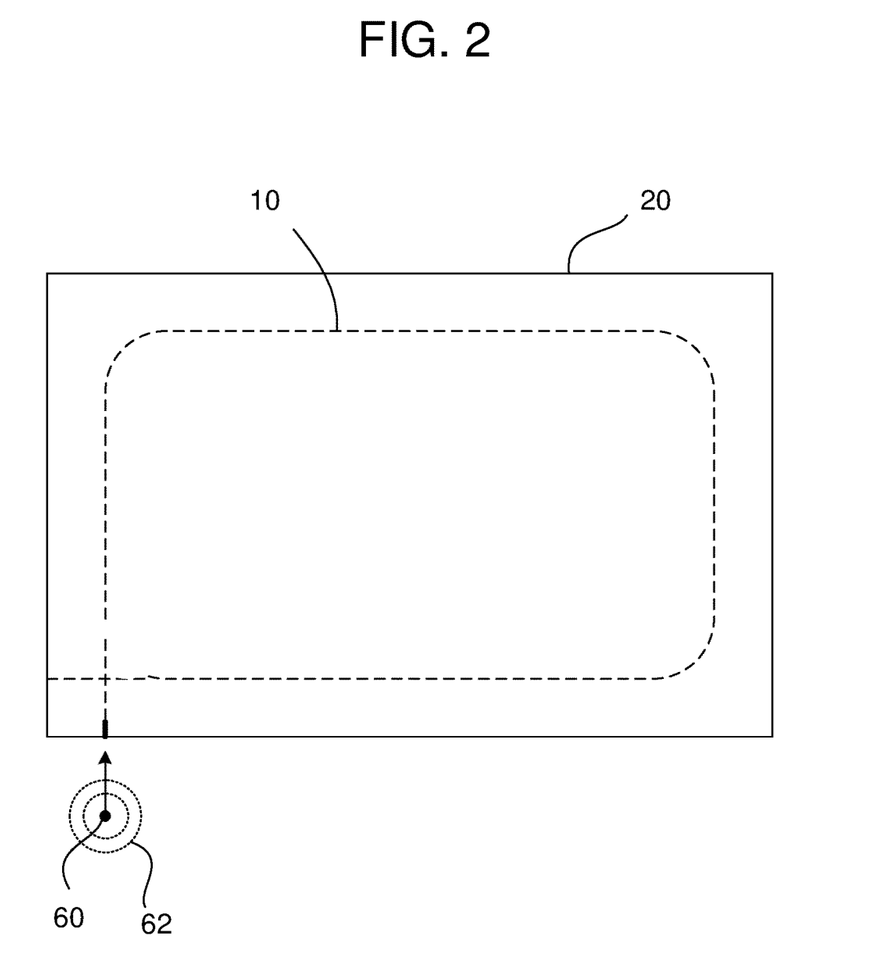
FIG. 2 is a top view of a source glass sheet from which the glass substrate of FIG. 1 may be produced.
Figure 3:
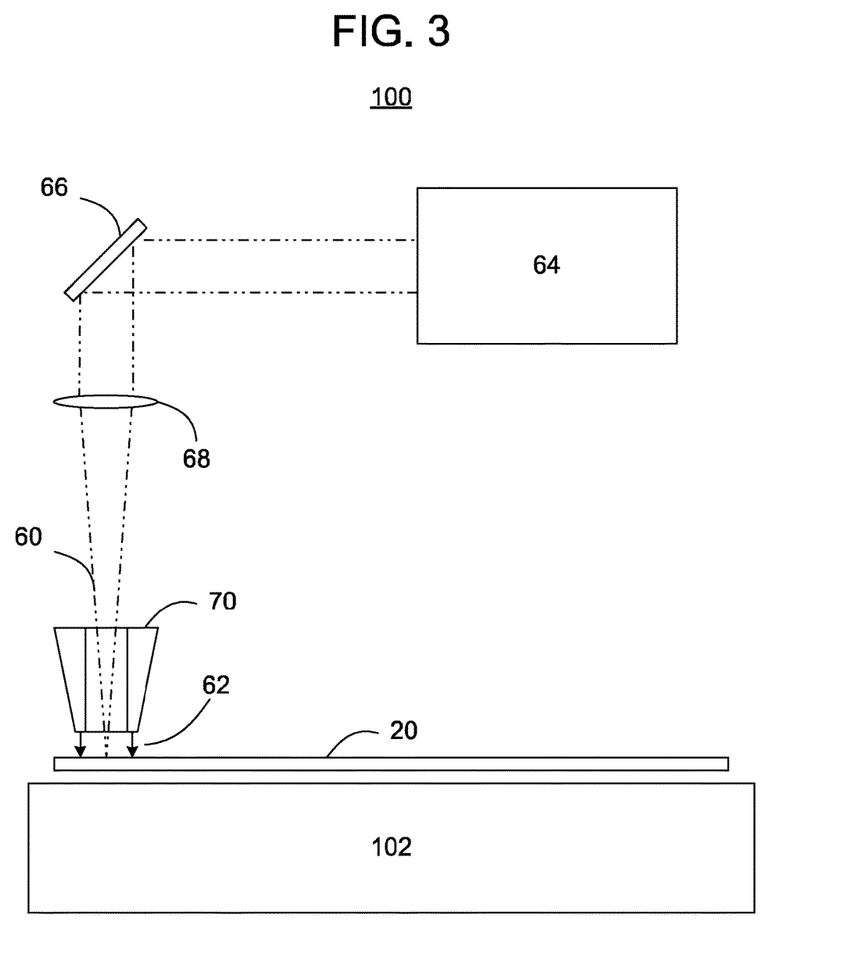
FIG. 3 is a schematic illustration of an apparatus that may be used to cut the glass substrate from the glass sheet.

Reference is now made to FIGS. 2-3, which show a top view of a source glass sheet 20 from which the glass substrate 10 of FIG. 1 may be produced, and a schematic illustration of an apparatus that may be used to cut the glass substrate 10 from the glass sheet 20, respectively. The novel methodology and apparatus disclosed herein provides for cutting the glass substrate 10 via propagation of a crack in the source glass sheet using a laser (for example a CO2 laser beam) and simultaneous provision of a cooling fluid (for example, a gas, such as air). In general, this arrangement results in the controlled propagation of the crack in the source glass sheet 20 along the desired cutting line in order to separate the glass substrate 10 from the glass sheet 20. A more detailed discussion of the methodology and apparatus for carrying out the initiation, propagation, and termination of the crack is provided later in this description.

As an initial phase of the process, the source glass sheet 20 (of the aforementioned thickness) is supported on a suitable support structure 102 and a free form cutting line (the dashed line in FIG. 2) is defined that establishes a closed pattern, where the cutting line circumscribes the desired final shape of the glass substrate 10. The support structure 102 may be configured to permit movement of the glass sheet 20 into position for laser cutting, and then movement of the glass substrate 10 (after the cutting process is complete) for further processing. For such purposes, the support structure 102 may include an air bearing mechanism, such as a commercially available pressure/vacuum table with discrete air and vacuum holes. The support structure 102 may provide: (i) an air-bearing mode for transportation of the glass sheet 20 and the glass substrate 10, and (ii) a combined air-bearing and vacuum mode, for holding the glass sheet 20, during laser cutting.

The air bearing mode is characterized by applying support fluid to one or more respective portions of the glass sheet 20 at least in proximity to the cutting line but preferable over a much larger area, and from a side (the underside) of the glass sheet 20 opposite to the cooling fluid 62 and the laser beam 60. The support fluid of the air bearing is delivered from the surface of the support structure 102 by way of the porosity of the surface and a source of fluid of varying pressure and flow (not shown). The air bearing mode operates to bias the glass sheet 20 away from the surface of the table of the support structure 20 as the laser beam 60 elevates the temperature of the glass sheet 20 and the cooling fluid 62 is directed in opposing fashion to the support fluid. The air bearing and vacuum mode provides for both positive fluid pressure (discussed above) and negative fluid pressure and flow to the glass sheet 20, thereby biasing and holding the glass sheet 20 toward the surface of the support structure 102 at a particular fly height.

An initial crack is initiated over a small length on the glass sheet 20, which is subsequently propagated using the aforementioned laser cutting technique. In general, the glass sheet 20 is scored at an initiation line (the initial crack) using a mechanical scoring device, for example a score wheel. Alternatively, a laser may be used to form an initiation crack or flaw to be propagated by the laser technique described. In order to appreciate the significance of the crack initiation and subsequent propagation of the crack, a more detailed discussion of the laser cutting technique will first be provided.

The laser beam 60 is used to heat the glass sheet 20 in a localized area and then to rapidly cool that area via the cooling fluid 62 in order to create transient tensile stress via the resultant temperature gradient. The aforementioned initial crack (initiation line) is created by introducing a small initial flaw on the surface of the glass sheet 20, which is then transformed into a vent (the crack) propagated by heating the localized zone via the laser beam 60 and cooling that zone via quenching action produced by the cooling fluid 62. The tensile stress, $\sigma$, produced during the process is proportional to $\alpha*E*\Delta T$, where a is a linear thermal expansion coefficient of the glass sheet 20, E is a modulus of elasticity of the glass sheet 20, and $\Delta T$ is a temperature difference on the surface of the glass sheet 20 produced by the heating (from the laser) and the cooling (from the fluid). The tensile stress is controlled in order to be higher than the molecular bonds of the glass sheet 20. For a given $\alpha*E$ tensile stress, $\sigma$ can be increased by heating the glass sheet 20 to a higher temperature via the laser beam 60. The described method uses full body glass separation (cutting), where the vent depth is equal to the thickness of the glass sheet 20.

The laser beam 60 may be implemented using a source 64 of laser energy, folding optics 66, and focusing optics 68. Application of the laser beam 60 to the glass sheet 20 starting at the initiation line (the initial crack) initiates propagation of the crack. Continuous moving of the laser beam 60 relative to the glass sheet 20 along the cutting line elevates the temperature of the glass sheet 20 at the cutting line (preferably to a substantially consistent temperature). Simultaneously, the cooling fluid 62 is applied relative to the laser beam 60 (via a nozzle 70), such that the cooling fluid 62 causes a temperature differential in the glass sheet 20 in order to induce the aforementioned tensile stress and propagate the crack (i.e., a fracture or vent) in the glass sheet 20 along the cutting line. Movement of the laser beam 60 and nozzle 70 relative to the glass sheet 20 may be achieved through any of the known conveyance mechanisms, including those wherein the laser and nozzle are moved relative to a stationary sheet, those wherein a sheet is moved relative to a stationary laser and nozzle, or those having a combination of both of the aforementioned conveyance mechanisms.

A particular combination of laser beam size, laser beam shape, and cooling fluid delivery affects the crack initiation, propagation, and termination in favorable ways. To appreciate the contemplated combination, a brief discussion of a traditional laser beam configuration is provided. In particular, the traditional configuration includes an elongated laser beam of various dimensions followed by the cooling fluid—where the source of the cooling fluid is positioned in an offset linear relationship (a trailing configuration) with respect to the elongate laser beam. This traditional arrangement (elongate laser beam and trailing coolant) is very efficient for straight laser cutting (or scoring), however, it does not allow for changing the direction of the crack propagation—and therefore no curved crack propagation is possible. Curved, free form, laser cutting may be achieved using the laser beam 60 of a round shape surrounded by an annular, circular, ring-shaped coolant fluid 62 (achieved using the coolant source nozzle 70). The circular laser beam 60, together with the annular coolant zone 62 does not exhibit any predefined or inherent orientation, and therefore can be used to propagate the crack in any direction (without having to use any complex beam shaping techniques or provide any additional motion axes for movement of the nozzle 70).

The source of laser power 64 may be implemented using CO2 laser mechanisms, however, other implementations are possible, for example a fiber laser, an Nd:YAG laser, or other laser systems. The type of laser system used may be matched with the composition and characteristics of the material to be cut. As long as the laser can induce sufficient thermal stress to overcome prevalent stresses in the substrate (which stresses in the substrate may be naturally present, or may be created by chemical or thermal strengthening, for example), it can cut the substrate. A carbon dioxide laser operates at the wavelength of 10.6 μm, which works well for display-type glasses, for example alkali-free alumino-boro silicate glasses, for example Corning® code EAGLE XG® glass available from Corning Incorporated, Corning N.Y. In general, using a laser beam 60 having the diameters disclosed herein allows certain advantageous effects, such as minimization of edge imperfections associated with the crack propagation (the smaller the beam diameter, the smaller the unstable crack propagation zone), and maintaining a reasonably high cutting speed even with a small diameter beam, resulting in relatively short processing time and high throughput.

With reference to FIGS. 4-7, it has been found that controlling one or more of a number of processing parameters during the cutting process has an appreciable effect on the quality of the cut edges of the resulting glass substrate 10, particularly on the edge strength. Indeed, in order to achieve the very high edge strengths of at least about 300 MPa to about 500 MPa or more, controlling one or more of the processing parameters is important. The processing parameters include: (i) an energy density of the laser beam 60, (ii) a velocity of the laser beam 60 relative to the glass sheet 20 along the cutting line, (iii) a fluid flow of the cooling fluid 62, and (iv) a minimum radius of curvature of the cutting line. The discussion of the parameters, below, is based on experimentation on Corning® EAGLE XG® alkali-free display glass. Although the actual values of particular parameters may vary slightly with different glass compositions, their manipulation will have similar effects and results in other glass types, for example, other brands of alkali-free display glass, display glass more generally, and glass for other purposes.

Figure 4:
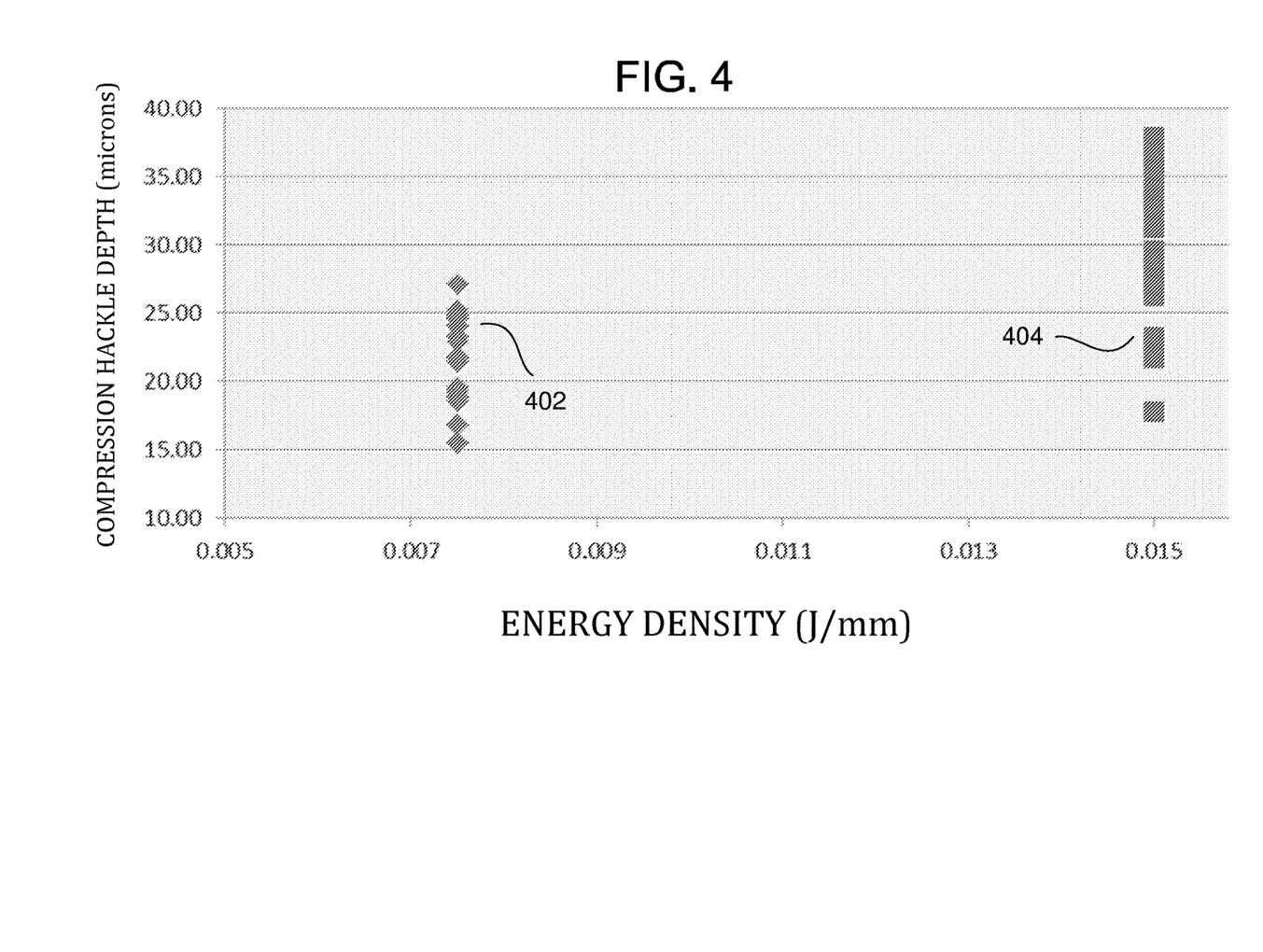
FIG. 4 is a plot of a relationship between energy density of the laser beam and compression hackle in the glass substrate.

With reference to FIG. 4, it has been found that the energy density of the laser beam 60 has a significant effect on the edge quality of the glass substrate 10. Among the possible edge quality characteristics to examine, the relationship between the energy density of the laser beam 60 and compression hackle was examined closely. FIG. 4 is a plot showing compression hackle depth (in micrometers, or microns, hereinafter "um") along the Y-axis and energy density (J/mm) of the laser beam 60 along the X-axis. Compression hackle is caused during the separation process and is directly related to the amount of buckle or warp in the glass sheet 20 from the energy applied from the laser beam 60. The energy of the laser beam 60 applies stress to the ultra-thin glass sheet 20, which produces a warp in the glass sheet 20 (exhibiting sinusoidal characteristics). As discussed above, crack propagation requires a tensile stress in the direction of propagation through the thickness of the glass sheet 20 from the bottom to the top. This phenomenon utilizes tensile stress on the bottom surface of the glass sheet 20 to separate or cut the part, but also applies a compressive stress to the top surface of the glass sheet 20, thereby creating compression hackle. The more stress applied, via laser energy, the more compression hackle is exhibited. Therefore, there is a balance between the laser energy applied and resultant edge quality.

Control of the laser energy applied is dependent on both the laser power produced by the laser beam 60 and the velocity of the laser beam 60 relative to the glass sheet 20 along the cutting line. The relationship is referred to as the energy density. Experimentation was performed on a number of samples to measure certain effects of the energy density, using a Gaussian spot laser beam of 2.5 mm diameter (fixed). The energy density was computed as follows: Energy Density (J/mm=Laser Power (J/s)/Velocity (mm/s). The effect of controlling the energy density of the laser beam 60 may be appreciated from reviewing the plot in FIG. 4, were a lower energy density 402 shows significantly less compression hackle and less variability in the hackle depth measurements as compared with a higher energy density 404. It is believed that controlling and/or optimizing the energy density should be performed first, prior to other tuning efforts, in order to achieve the aforementioned edge strength goals.

Based on the above, controlling the energy density of the laser beam 60 should be rigorously considered in order to achieve the very high edge strengths contemplated herein. For example, in connection with the glass sheet 20 thicknesses contemplated herein, the energy density should be controlled to be at least one of: (i) less than about 0.015 J/mm; (ii) less than about 0.014 J/mm; (iii) less than about 0.013 J/mm; (iv) less than about 0.012 J/mm; (v) less than about 0.011 J/mm; (vi) less than about 0.010 J/mm; (vii) less than about 0.009 J/mm; and (viii) less than about 0.008 J/mm.

Figure 5:
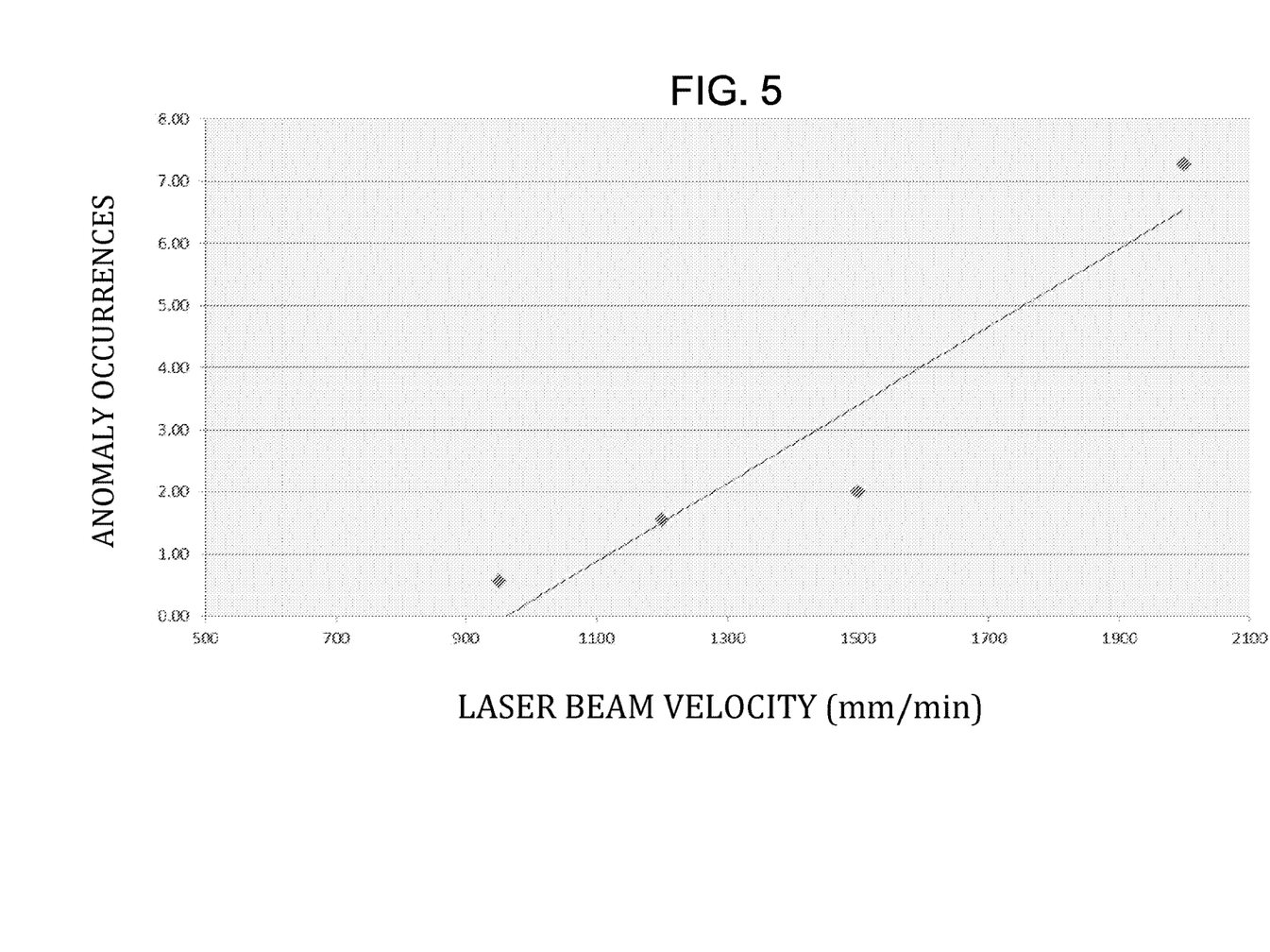
FIG. 5 is a plot of a relationship between velocity of the laser beam and compression hackle in the glass substrate.

As mentioned above, velocity of the laser beam 60 with respect to the glass sheet 20 is an important parameter of the energy density calculation (and thus in edge quality). The velocity parameter should be tuned in order to manage the propagation of the crack along the cutting line, to optimize the crack performance, and ultimately to ensure good edge strength. Surges in the propagation of the crack have been observed during experimentation and are believed to cause arrests (such as compressive hackle) in the edges and even failure in the cutting process. Such arrests are difficult to manage and require rigorous experimentation to determine proper limits of operation, such as velocity.

FIG. 5 is a plot showing the relationship of velocity to a number of arrest anomalies (such as compressive hackle) that occur during the cutting process. The plot is characterized by the number of occurrences of the anomaly on the Y-axis and velocity (mm/min) of the laser beam 60 on the X-axis. The experimentation was performed at a constant energy density per iterative change in velocity by adjusting the laser power. Arrests were seen in the data at relatively high velocity. Crack surging was also observed during such high velocities. The arrests are very undesirable as they yield extremely weak edges and can cause a jog in the cutting path that is outside of the desired dimensional tolerances.

Based on the above, controlling the velocity of the laser beam 60 relative to the glass sheet 20 should be rigorously considered in order to achieve the very high edge strengths contemplated herein. For example, in connection with the glass sheet 20 thicknesses contemplated herein, the velocity of the laser beam 60 relative to the glass sheet 20 along the cutting line should be controlled to be at least one of: (i) less than about 2000 mm/min; (ii) less than about 1900 mm/min; (iii) less than about 1800 mm/min; (iv) less than about 1700 mm/min; (v) less than about 1600 mm/min; (vi) less than about 1500 mm/min; (vii) less than about 1400 mm/min; (viii) less than about 1300 mm/min; (ix) less than about 1200 mm/min; (x) less than about 1100 mm/min; and (xi) less than about 1000 mm/min.

Figure 6:
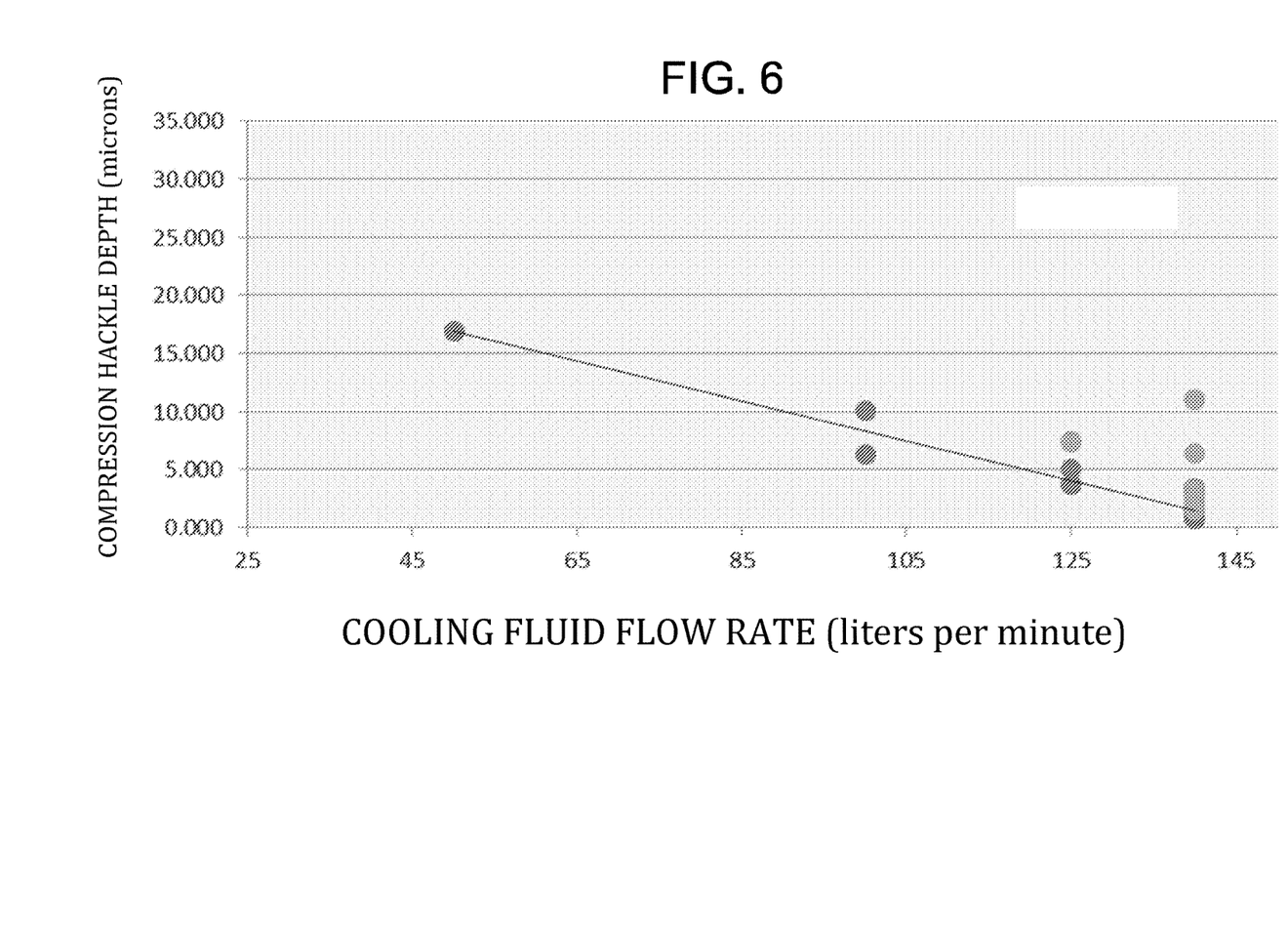
FIG. 6 is a plot of the relationship between the flow rate of the cooling fluid and the resultant compressive hackle in the glass substrate.
Figure 7:
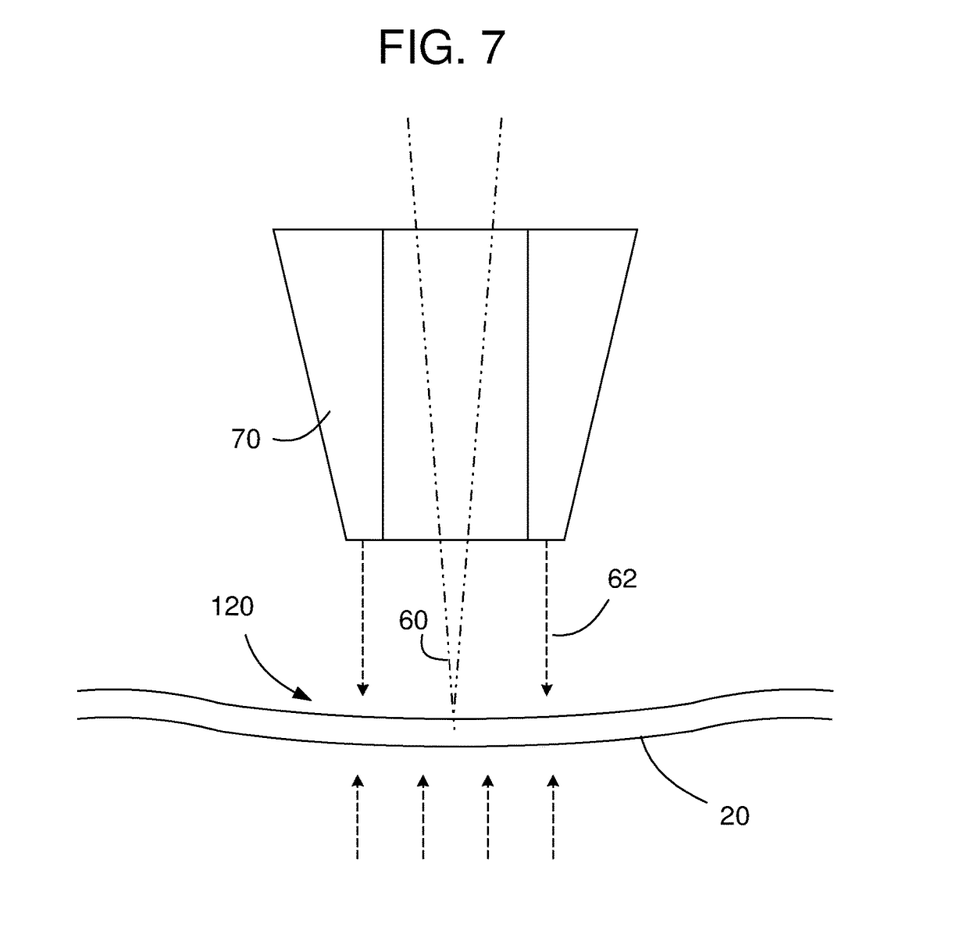
FIG. 7 is a localized side view of the mechanical effects of the cooling fluid applied from above the glass sheet.

As mentioned above, the effect of the cooling fluid 62 flow on the edge strength is also an important consideration. In this regard, reference is made to FIGS. 6 and 7. FIG. 6 is a plot of the relationship between the flow rate of the cooling fluid 62 and the resultant compressive hackle. The compressive hackle depth (um) is shown along the Y-axis and the flow rate (liters per minute—lpm) is shown on the X-axis. Hackle depth is measured with an optical microscope at 20× magnification and is defined as the distance from the top surface (laser incidence) of the glass to the point at which the stress fracture line extends. The units are typically defined as a direct measurement in microns but can be defined as a percentage of the substrate thickness as well. FIG. 7 is a localized side view of the effects of the cooling fluid 62 applied from above the glass sheet 20 and the air bearing fluid flow (and possibly vacuum) applied from below the glass sheet 20.

The nozzle 70 provides a dual role: (i) to apply the cooling fluid 62 in a precise orientation and location with respect to the laser beam 60 (to locally cool the glass sheet 20, to exacerbate local stress, and to propagate the crack); and (ii) to apply a mechanical force to the top surface of the glass sheet 20 (to oppose the buckling of the glass sheet 20 caused by the heat from the laser beam 60). As shown in FIG. 7, the cooling fluid 62 flow may interact in such a way as to affect localized influences on the deformation of the glass sheet 20.

For example, controlling the flow rate of the cooling fluid 62 from above the glass sheet 20 may provide: (i) some opposition to the buckling of the glass sheet 20 in the cutting zone (at relatively lower flow rates), (ii) relative flattening of the glass sheet 20 in the cutting zone (at higher flow rates), and/or (iii) a depression zone 120 (at even higher flow rates).

The dual functions (cooling and mechanical pressure) may permit further fine tuning of the cutting process in order to reduce compression hackle and increase edge strength. For example, increasing the flow rate of the cooling fluid 62 may decrease the compressive stress, which aids in creating a high quality, high strength edge. Note that the position of the nozzle 70 relative to the laser beam 60 is dependent upon the glass sheet 20 thickness and composition, which is important in applying the cooling and the mechanical force in the precise location to maximize separation and manage the crack behavior during propagation.

Based on the above, controlling the flow rate of the cooling fluid 62 should be rigorously considered in order to achieve the very high edge strengths contemplated herein. For example, in connection with the glass sheet 20 thicknesses contemplated herein, the fluid flow of the cooling fluid 62 should be controlled to be at least one of: (i) at least about 60 lpm; (ii) at least about 70 lpm; (iii) at least about 80 lpm; (iv) at least about 90 lpm; (v) at least about 100 lpm; (vi) at least about 110 lpm; (vii) at least about 120 lpm; (viii) at least about 130 lpm; and (ix) at least about 140 lpm. The foregoing cooling fluid rates are for air as a cooling fluid, and the actual numerical value of the flow rates for other cooling fluids may be slightly different based on their specific heat capacity {in terms of heat flux/(mass times change in temperature) or $C=Q/(m \cdot \Delta T)$, wherein C is specific heat capacity, Q is heat flux, m is mass, and $\Delta T$ is change in temperature} relative to air. For example, if a cooling fluid had a higher specific heat capacity than air, a smaller quantity of that fluid, as by using a smaller flow rate for example, would be necessary to achieve the same change in temperature of the glass to create a similar glass-cutting stress profile as that created by the air at the given flow rate. Beneficially, though, air can be used to minimize stain on the glass, which may result from liquid cooling. When cutting a free form line, the type of nozzle used (and flow rate) differ from those for straight-line-only cutting. For cutting free form lines, an annular nozzle is advantageous and the air flow for any curved portions advantageously differs from that for cutting straight line portions.

Figure 8:
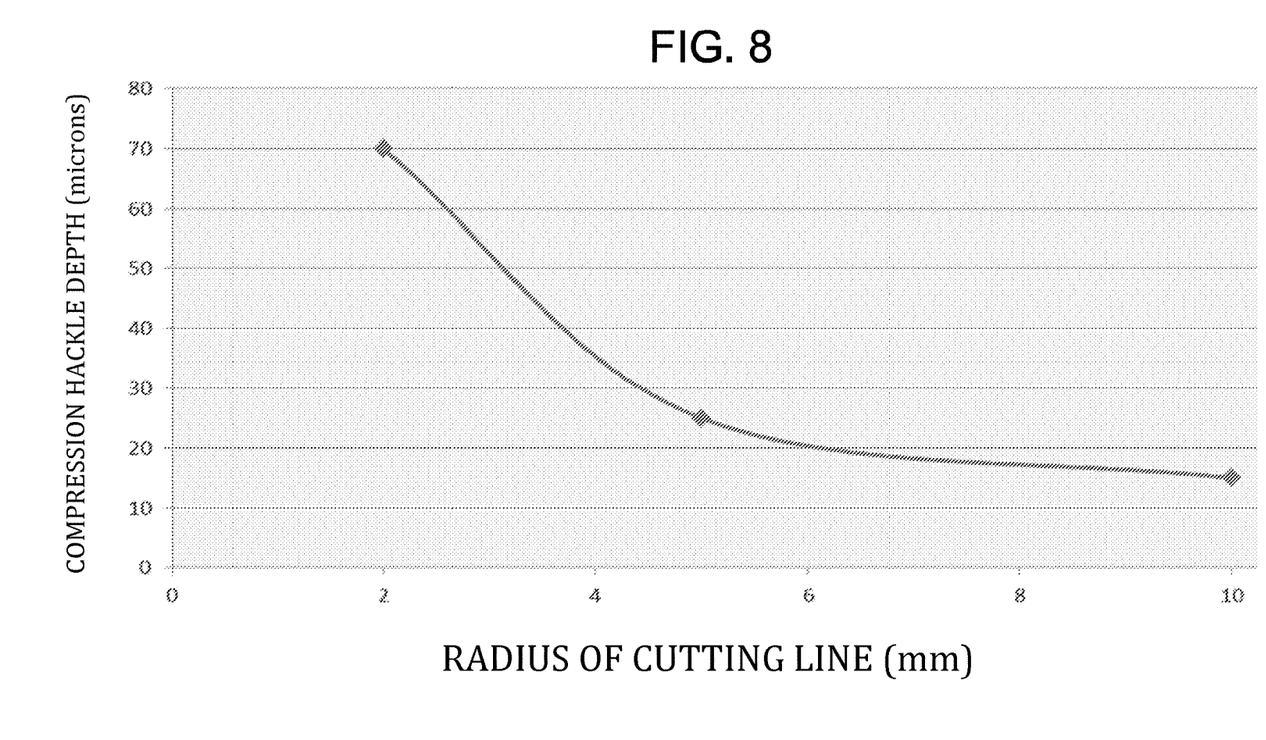
FIG. 8 is a plot illustrating the relationship of a radius of the cutting line and the resultant compressive hackle in the glass substrate.

As mentioned above, the effect of the radius of any curved portion of the cutting line on the edge strength is also an important consideration. In this regard, reference is made to FIG. 8, which is a plot illustrating that a radius of the cutting line has a significant impact on edge quality and process performance. The plot is characterized by compressive hackle depth (um) on the Y-axis and radius (mm) on the X-axis. Radius cutting is a dynamic process which requires additional energy and a more limited velocity due to the nature of changing directions and cutting through variable stress fields that are normally insignificant during straight line cutting processes. The data of FIG. 8 shows that the smaller the radius of curvature of the cutting line, the higher the expected compression hackle depth. The process of determining the cutting parameters (energy density, velocity, and cooling fluid flow) for a radius dimension is similar as for a straight line cut; however the particular set points may be significantly different, and much more sensitive, particularly as the radius becomes relatively small.

Based on the above, controlling the radius of curvature for a given portion of the cutting line should be rigorously considered in order to achieve the very high edge strengths contemplated herein. For example, in connection with the glass sheet 20 thicknesses contemplated herein, the minimum radius of curvature of the cutting line is controlled to be at least one of: (i) at least about 2 mm; (ii) at least about 3 mm; (iii) at least about 4 mm; and (iv) at least about 5 mm.

Figure 9:
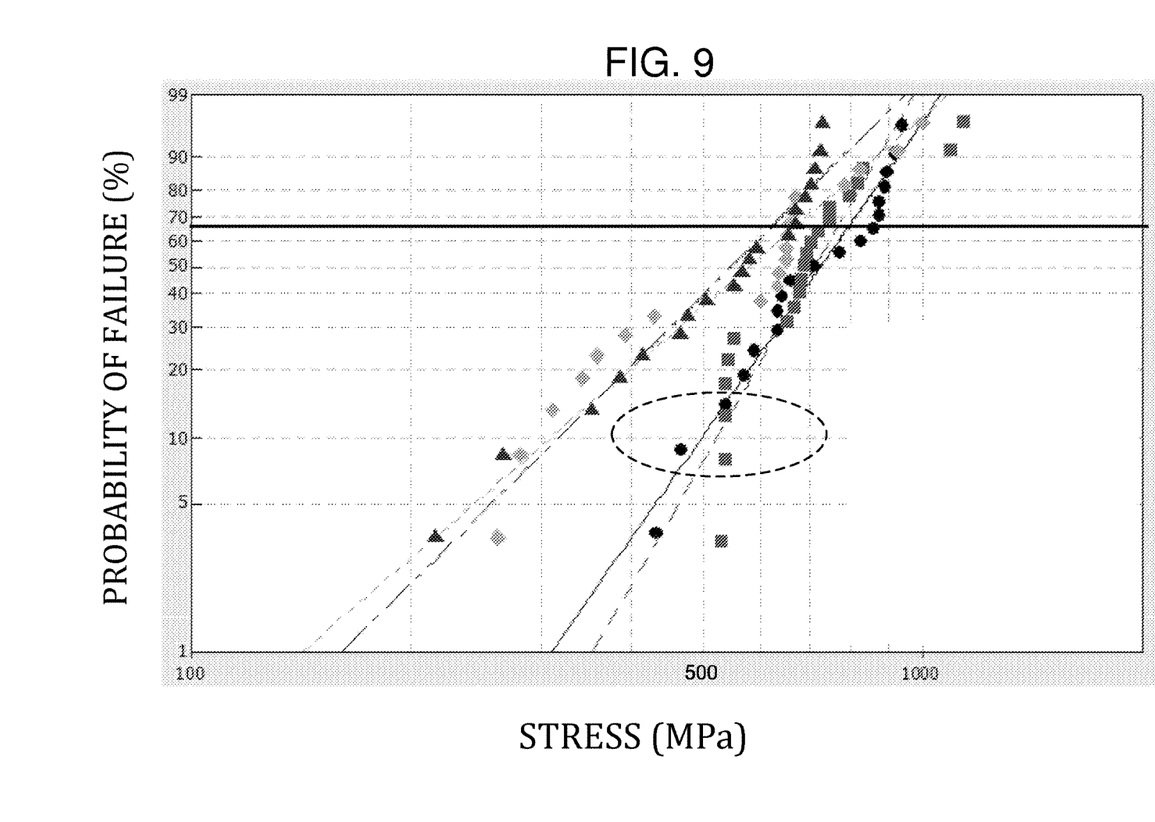
FIG. 9 is a plot showing edge strength of glass substrates cut using the laser process, particularly failure probability versus maximum stress.
Figure 10:
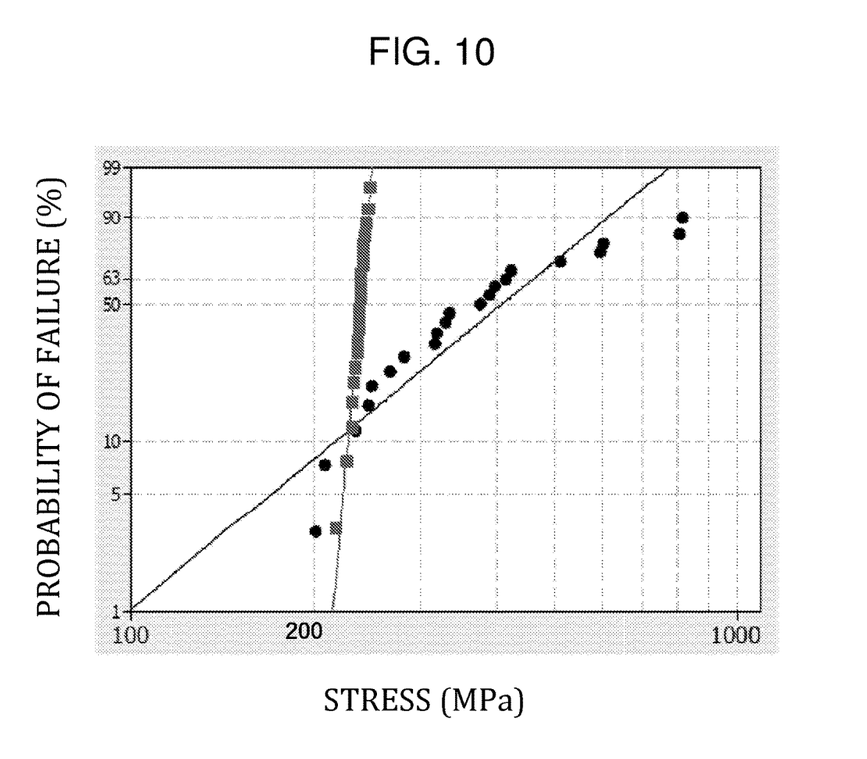
FIG. 10 is a plot showing edge strength of glass substrates cut using a mechanical process, particularly failure probability versus maximum stress.

A number of experiments were conducted on glass sheets 20 within the thicknesses contemplated herein (e.g., 100 um) and using the parameters discussed above. The edge strength of the resulting glass substrates 10 were measured and plotted in FIG. 9. The plot is characterized by failure probability (%) along the Y-axis and maximum stress (MPa) along the X-axis. Thus, the edge strength is expressed as the B10 value of the Weibull distribution (meaning that with 95% confidence, 90% of the parts generated with an optimized laser process will exceed the B10 strength measure). As one can see, a statistically significant number of samples exhibited edge strength in the 450-500 MPa range. For each of the four data sets (triangle, diamond, circle, and square), the B10 value was greater than 300 MPa. For each of the circle and square data sets, the B10 number is greater than or equal to 500 MPa. The samples also exhibited minimal edge defects (e.g., chipping, arrests and compression hackle). By comparison, FIG. 10 is a plot for a mechanical cutting process (score and snap), wherein there were used glass and shape parameters similar to those described above in connection with FIG. 9. As seen from FIG. 10, the mechanical cutting process yielded a B10 edge strength value of only about 225 MPa.

Although the disclosure herein has been described with reference to particular embodiments, it is to be understood that these embodiments are merely illustrative of the principles and applications of the embodiments herein. It is therefore to be understood that numerous modifications may be made to the illustrative embodiments and that other arrangements may be devised without departing from the spirit and scope of the present application.

The invention claimed is:

1. A method of propagating a fracture in a glass sheet along a cutting line of the glass sheet to separate a glass substrate from the glass sheet, comprising:
   applying a laser beam to a beam location on the cutting line of the glass sheet and continuously moving the beam location relative to the glass sheet along the cutting line while the laser beam is applied to the beam location to elevate a temperature of the glass sheet at the beam location on the cutting line; and
   applying a cooling fluid to a cooling band on the glass sheet to reduce a temperature of the glass sheet along the cooling band while elevating the temperature of the glass sheet at the beam location with the laser beam, the cooling band comprises a cooling ring that circumscribes the beam location on the cutting line with the cooling band circumferentially spaced from the beam location while the cooling band and the beam location move simultaneously together in order to propagate a fracture in the glass sheet along the cutting line to separate the glass substrate from the glass sheet, and the cooling fluid applies a mechanical force to the glass sheet sufficient to oppose buckling of the glass sheet.

2. The method of claim 1, a thickness of the glass sheet is one of: (i) between about 0.05 mm-about 0.3 mm, and (ii) between about 0.075 mm-about 0.250 mm.

3. The method of claim 2, further compromising controlling the energy density of the laser to be at least one of: (i) less than about 0.015 J/mm; (ii) less than about 0.014 J/mm; (iii) less than about 0.013 J/mm; (iv) less than about 0.012

J/mm; (v) less than about 0.011 J/mm; (vi) less than about 0.010 J/mm; (vii) less than about 0.009 J/mm; and (viii) less than about 0.008 J/mm.

4. The method of claim 2, wherein the velocity of the laser beam relative to the glass sheet along the cutting line is controlled to be at least one of: (i) less than about 2000 mm/min; (ii) less than about 1900 mm/min; (iii) less than about 1800 mm/min; (iv) less than about 1700 mm/min; (v) less than about 1600 mm/min; (vi) less than about 1500 mm/min; (vii) less than about 1400 min/min; (viii) less than about 1300 mm/min; (ix) less than about 1200 mm/min; (x) less than about 1100 mm/min; and (xi) less than about 1000 mm/min.

5. The method of claim 4, wherein the velocity of the laser beam relative to the glass sheet along the cutting line is ≤1100 mm/min, and an average number of arrest anomalies is <1 per cut glass substrate produced, wherein arrest anomalies comprise crack propagation surging and branching.

6. The method of claim 2, wherein the fluid flow of the cooling fluid is controlled to be at least one of: (i) at least about 60 lpm; (ii) at least about 70 lpm; (iii) at least about 80 lpm; (iv) at least about 90 lpm; (v) at least about 100 lpm; (vi) at least about 110 lpm; (vii) at least about 120 lpm; (viii) at least about 130 lpm; and (ix) at least about 140 lpm.

7. The method of claim 6, wherein the fluid is air.

8. The method of claim 2, wherein the minimum radius of curvature of the cutting line is controlled to be at least one of: (i) at least about 2 mm; (ii) at least about 3 mm; (iii) at least about 4 mm; and (iv) at least about 5 mm.

9. The method of claim 1, wherein the cut glass substrate comprises a probability of failure lower than 10% for a two-point bend test (B10 edge strength) with an applied load of about 300 MegaPascals (MPa) to about 500 MPa.

10. The method of claim 9, wherein the cut glass substrate comprises a probability of failure lower than 10% for a two-point bend test (B10 edge strength) with an applied load of about 400 MPa to about 500 MPa.

11. The method of claim 10, wherein the cut glass substrate comprises a load under which probability of failure is lower than 10% for a two-point bend test (B10 edge strength) with an applied load of about 450 MPa.

12. The method of claim 1, wherein the laser beam is circular.

13. The method of claim 12, wherein a diameter of the laser beam is one of: (i) between about 1 mm to about 4 mm, and (ii) 2 mm.

14. An apparatus for cutting a glass sheet along a cutting line to separate a glass substrate from the glass sheet, comprising:
a laser source configured to apply a laser beam to a beam location on the cutting line of the glass sheet to elevate a temperature of the glass sheet at the beam location on the cutting line; and
a source of cooling fluid configured to apply a cooling fluid at about 60 lpm or more to a cooling band on the glass sheet to reduce a temperature of the glass sheet along the cooling band while elevating the temperature of the glass sheet at the beam location with the laser beam, wherein the source of cooling fluid is configured to apply the cooling band as a cooling ring to circumscribe the beam location on the cutting line with the cooling band circumferentially spaced from the beam location while the cooling path and the beam location move simultaneously together in order to propagate a fracture in the glass sheet along the cutting line to separate the glass substrate from the glass sheet.

* * * * *